(12) United States Patent
Romine et al.

(10) Patent No.: US 10,367,895 B1
(45) Date of Patent: Jul. 30, 2019

(54) SYSTEMS AND METHODS FOR HOSTING A SINGLE-TENANT COMPUTING APPLICATION FOR ACCESS BY A PLURALITY OF COMPUTING DEVICES

(71) Applicant: Right Networks, LLC, Hudson, NH (US)

(72) Inventors: Philip Romine, Nashua, NH (US); John Farrer, Naples, FL (US); Hian-Thai Tjen, Dover, MA (US)

(73) Assignee: Right Networks, LLC, Hudson, NH (US)

( * ) Notice: Subject to any disclaimer, the term of this patent is extended or adjusted under 35 U.S.C. 154(b) by 0 days.

(21) Appl. No.: 16/351,467

(22) Filed: Mar. 12, 2019

Related U.S. Application Data

(60) Provisional application No. 62/685,636, filed on Jun. 15, 2018.

(51) Int. Cl.
| | |
|---|---|
| *G06F 15/16* | (2006.01) |
| *H04L 29/08* | (2006.01) |
| *H04L 29/06* | (2006.01) |
| *G06F 9/455* | (2018.01) |
| *G06F 16/954* | (2019.01) |

(52) U.S. Cl.
CPC ........ *H04L 67/141* (2013.01); *G06F 9/45558* (2013.01); *G06F 16/954* (2019.01); *H04L 67/10* (2013.01); *H04L 67/40* (2013.01); *H04L 67/42* (2013.01); *G06F 2009/45595* (2013.01)

(58) Field of Classification Search
CPC ....... H04L 67/141; H04L 67/10; H04L 67/40; H04L 67/42; G06F 16/954; G06F 9/45558

USPC .................................................. 709/217, 224
See application file for complete search history.

(56) References Cited

U.S. PATENT DOCUMENTS

| | | | |
|---|---|---|---|
| 8,326,876 B1* | 12/2012 | Venkataraman | G06F 16/252 707/784 |
| 9,130,899 B1* | 9/2015 | Baird | G06F 16/95 |
| 2012/0127206 A1* | 5/2012 | Thompson | G06F 3/038 345/661 |

(Continued)

OTHER PUBLICATIONS

Microsoft, Hypervisor Top-Level Functional Specification: Windows Server 2012 R2, 420 pages, (2013).

(Continued)

*Primary Examiner* — Philip B Tran
(74) *Attorney, Agent, or Firm* — William R. Haulbrook; Michael D. Schmitt; Choate, Hall & Stewart LLP

(57) ABSTRACT

Presented herein are systems and methods related to efficiently hosting one or more computing applications on a server for remote access by a plurality of user computing devices (e.g., personal computers, smart phones, tablet computers, or the like). Applications can be hosted on a server that is part of a distributed (e.g., clustered) computing system. The server can be a physical server or a virtual server (e.g., a cloud-based server). The computing application is executed in a host operating system of the server. The host operating system includes one or more specially designed pattern files, which a processor of the server uses to produce user-specific calls for execution in the hosted computing application. These unique user-specific calls allow a plurality of user devices to efficiently access and operate a single instance of a computing application.

30 Claims, 7 Drawing Sheets

(56) References Cited

U.S. PATENT DOCUMENTS

| | | | |
|---|---|---|---|
| 2014/0188977 A1* | 7/2014 | Song | H04L 67/10 |
| | | | 709/203 |
| 2016/0006803 A1* | 1/2016 | Kumar | H04L 67/1091 |
| | | | 709/203 |
| 2016/0366130 A1* | 12/2016 | Jung | H04L 63/08 |
| 2018/0278675 A1* | 9/2018 | Thayer | H04L 41/0806 |
| 2018/0278725 A1* | 9/2018 | Thayer | H04L 69/08 |

OTHER PUBLICATIONS

Microsoft, Introduction to Hyper-V on Windows 10, 78 pages, (2018).
Microsoft, Introduction to Hyper-V Architecture, 4 pages, (2018).

* cited by examiner

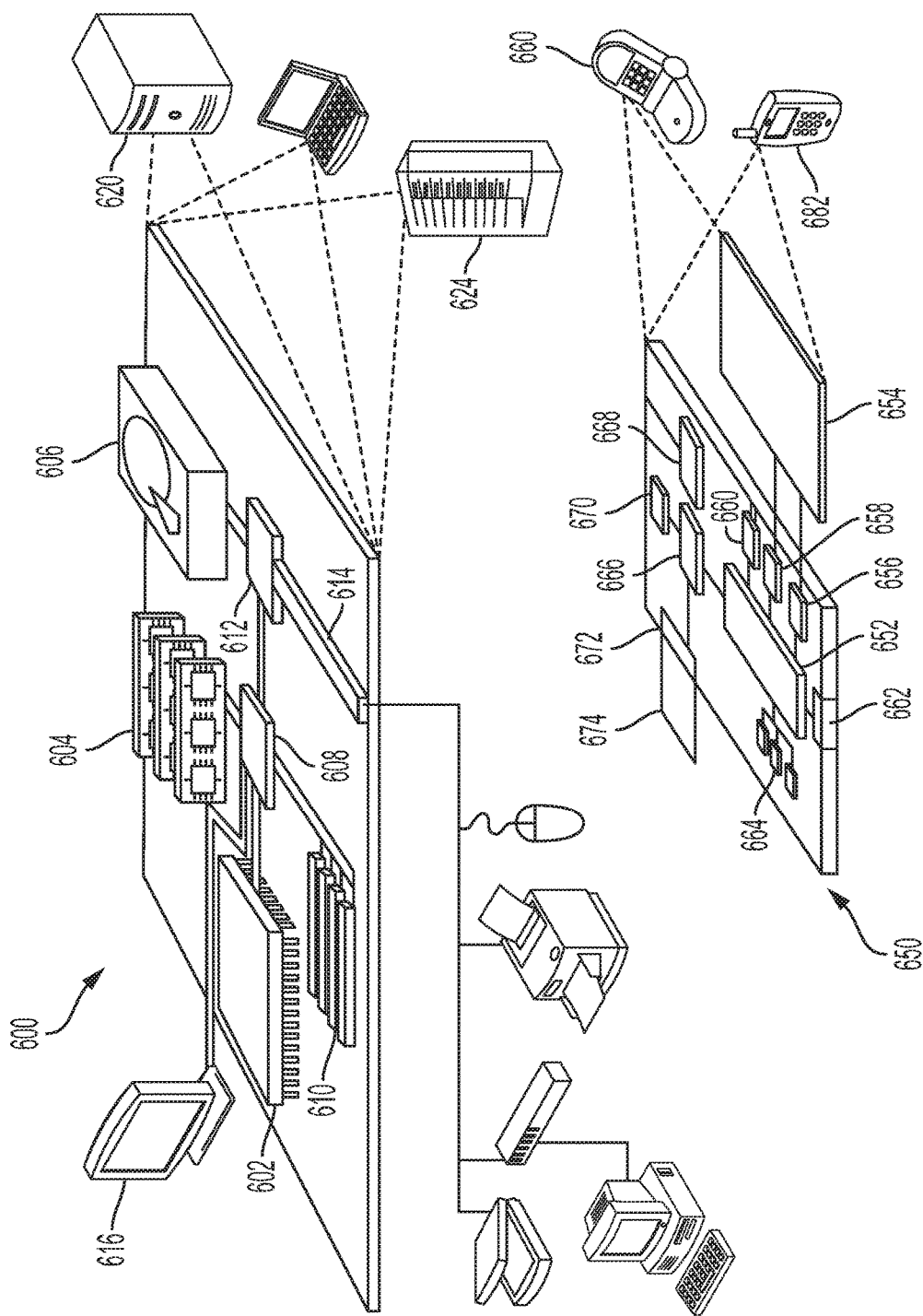

SYSTEMS AND METHODS FOR HOSTING A SINGLE-TENANT COMPUTING APPLICATION FOR ACCESS BY A PLURALITY OF COMPUTING DEVICES

CROSS REFERENCE TO OTHER APPLICATIONS

This application claims benefit of U.S. Provisional Application No. 62/685,636, filed Jun. 15, 2018, the content of which is hereby incorporated herein by reference in its entirety.

FIELD

This invention relates generally to methods, systems, and architectures related to hosting a computing application. In particular, in certain embodiments, the systems and methods described herein are related to efficiently hosting a single-tenant computing application on a server for remote access by a plurality of user computing devices.

BACKGROUND

Virtualization allows computing tasks to be divided between different system resources for improved efficiency and for remote access to computing applications. Instead of requiring a separate computer for each user, a server can be configured to host multiple virtual machines each of which allows computing applications (e.g., software applications) to be accessed and operated by a user. These virtual machines allow users to remotely access computing applications via a network without requiring the applications to be installed on each user's computing device. For example, virtual desktops and virtual applications are stored and executed on a remote server rather than on each user's local computing device. Virtual desktops and virtual applications are increasingly used in certain industries, such as accounting because of reduced hardware and maintenance costs. Virtualization also provides increased resource redundancy in order to prevent data loss or loss of functionality when a portion of the system resources are shut down for maintenance.

Despite the benefits of virtualization, conventional virtualization technology has several limitations. Virtualization does not scale well for very large numbers of users. For example, most commonly used computing applications are configured as single-tenant applications such that only one user can access a single installation of the computing application at a given time. In order to host a single-tenant application using virtualization, a separate virtual machine is typically prepared for each and every user. An example of this approach is depicted in FIG. 1A in which each of users 105a-d access their own respective instance of applications 115a-d in a corresponding separate instance of guest operating system 120a-d. Thus, multiple instances of each computing application and multiple instances of the guest operating system (one for each user) must be installed on a single server, resulting in inefficient utilization of server resources and increased operating costs.

The few available alternative approaches to that shown in FIG. 1A include application streaming technology, but like the approach in FIG. 1A, this approach also suffers from loss of license integrity, limited functionality, and a lack of application support for customizations which each user might make or want to make. The functionality of a hosted virtual computing application can be limited compared to that of the same application when it is installed directly on a user's personal computing device. An application provided in a virtual desktop or as a virtual application often lacks the full set of features and customizations that a user might be accustomed to accessing when the application is installed and run directly on the user's computing device.

It is desirable for a hosted computing application to perform and "feel" as though it were locally installed and executed on the user's computing device. However, conventional approaches for hosting computing applications fall short of this goal. There is thus a need for improved systems and methods of hosting computing applications for efficient and reliable remote access by a plurality of user computing devices.

SUMMARY

Presented herein are systems and methods related to efficiently hosting one or more computing applications on a server for remote access by a plurality of user computing devices (e.g., personal computers, smart phones, tablet computers, or the like). Applications can be hosted on a server that is part of a distributed (e.g., clustered) computing system. The server can be a physical server or a virtual server (e.g., a cloud-based server). The computing application is executed in a host operating system of the server. The host operating system includes one or more specially designed pattern files, which a processor of the server uses to produce user-specific calls for execution in the hosted computing application. These unique user-specific calls allow a plurality of user devices to efficiently access and operate a single instance of a computing application.

The hosted computing application can be a single-tenant computing application. No modifications to the single-tenant application are required to provide access to multiple users simultaneously. There is no need for individual software vendors to redesign the hosted computing applications. Instead, the applications can be hosted in their original configuration, providing the same user experience as though the application were installed directly on each user computing device. Software licenses may be effectively validated for each of the plurality of user computing devices accessing the computing application without loss of license integrity (e.g., as is common for conventional approaches to multi-tenant application virtualization).

In certain embodiments, a file path assessment, as described herein, is performed by a processor of the server to determine whether a file should be redirected to a remote file system. Similarly, in certain embodiments, a registry path assessment is performed by a processor of the server to determine whether a registry path of the computing application should be redirected, for example, from the default registry path of the application to a user-specific registry path. Each of these assessments (i.e., the file path assessment and the registry path assessment) facilitates efficient access of a single instance of the hosted computing application by multiple user computing devices. For example, in certain embodiments, 60 or more user computing devices can access a single instance of the hosted computing application.

The systems and methods described herein provide increased efficiency of server utilization and decreased costs associated with building and maintaining the server. For example, a server used in the systems and methods described herein does not require a separate virtual application for each and every user. Each and every feature of the computing application is not virtualized. Instead, as described herein, user-specified calls are produced from a user input using one or more specially constructed pattern files, allowing a plurality of users to interact with the single instance of a computing application at the same time (see, e.g., FIG. 1B, FIG. 2, and the corresponding descriptions below).

The systems and methods described herein provide fail-safes for improving network utilization. For example, if one or more servers are down (e.g., for routine or emergency maintenance, e.g., because of an interruption in utility services, e.g., for any other reason) a user's computing device may be re-routed to access the same computing application on a different server. For example, a virtual network management module may, responsive to a request for access to a hosted computing application, determine an optimal or preferred server for providing high speed and reliable access to the requested application prior to allowing access to the selected server. The user will have the same experience interacting with the computing application no matter which server is selected.

The systems and methods described herein provide for improved and more efficient maintenance and upgrading of the server and related software. System maintenance and deployment is streamlined via tools which allow for straightforward maintenance and troubleshooting by technicians. In order to perform these maintenance tasks, the technicians do not require special expertise (e.g., expertise equivalent to that of the system developers) in the underlying server architecture and/or software. For example, an application maintenance module (e.g., which may be associated with a specific computing application or a class of related applications) may provide real-time feedback to the technician via a straightforward text-based interface or graphical user interface. Updates or other modifications to the system may be efficiently rolled forward or rolled backward such that the operational down time of the server is minimized. New and/or different applications may thus be rapidly deployed without substantial system down times. In some embodiments, the application maintenance module may be accessed by a technician while the server is still in operation (e.g., is still accessible to user computing devices).

In one aspect, the invention is directed to a system for hosting one or more computing applications for remote access by a plurality of user computing devices, the system comprising: a processor and a memory of a server [e.g., a physical server, e.g., a virtual server (e.g., a cloud-based server)], the memory storing instructions which, when executed by the processor, cause the processor to: receive, via a network (e.g., continuously, e.g., in real time), a plurality of user inputs from one or more user computing devices of the plurality of user computing devices, wherein each user input of the plurality of user inputs is associated with a computing application of the one or more computing applications in (e.g., executed in) a host operating system of the server, wherein the host operating system comprises one or more pattern files for redirection (e.g., user-specific redirection) of (i) one or more file paths, (ii) one or more registry paths, or both of (i) and (ii); for each user input of the plurality of user inputs, produce, using the user input and at least one of the one or more pattern files, a user-specific call (e.g., command) in the computing application [e.g., by transmitting (e.g., redirecting) a file associated with the computing application to a remote (e.g., user-specific) file path of the host operating system, e.g., by transmitting (e.g., redirecting) a registry entry or key associated with the computing application to a user-specific registry path of the host operating system, e.g., by redirecting a registry call by the computing application to a user-specific registry path of the host operating system]; and for the user-specific call produced for each corresponding user input, perform (e.g., execute) a user-specific action in the computing application (e.g., to create, access, edit, open, close, or save a file associated with the computing application, e.g., wherein the performed user-specific action corresponds only to user input from the user computing device associated with the user-specific call and does not correspond to a user input from a different user computing device) (e.g., thereby allowing a plurality of user computing devices to efficiently access and/or operate the computing application in the host operating system at the same time).

In certain embodiments, the instructions, when executed by the processor, cause the processor to produce the user-specific call for each user input comprise instructions to: determine whether the user input corresponds to a file operation event associated with creation and/or access of a file on the server (e.g., wherein the created and/or accessed file is associated with the computing application); and responsive to a determination that the user input corresponds to a file operation event associated with creation and/or access of the file on the server, automatically perform a file path redirection routine using a file path (e.g., an alphanumeric string corresponding to a "save location") of the created and/or accessed file and at least one of the one or more pattern files, wherein the file path redirection routine comprises: (i) a file path assessment (e.g., to assess whether file path redirection is required). (ii) responsive to a determination, by the processor (e.g., and by the file path assessment), that file redirection is required, automatic transmission of the file to a remote file system (e.g., and a user-specific file path) (e.g., wherein the remote file system is not stored on the server), and (iii) responsive to a determination, by the processor (e.g., and by the file path assessment), that file redirection is not required, transmission of the file to a local file location (e.g., wherein the local file location is stored on the server). In certain embodiments the file path assessment comprises an assessment of a similarity of a file path name of the created and/or accessed file (e.g., an alphanumeric string associated with a default file path of the created and/or accessed file) and a file path name in at least one of the one or more pattern files (e.g., an alphanumeric string in the at least one pattern file) (e.g., an assessment of whether the file path name of the created and/or accessed file is the same as a file path name in the at least one pattern file). In certain embodiments, each pattern file of the one or more pattern files: (i) is associated with a user-specific file path of the remote file system, and (ii) comprises a plurality of file path names corresponding to a redirection of the created and/or accessed file to the user-specific file path in the remote file system.

In certain embodiments, the instructions which, when executed by the processor, cause the processor to produce the user-specific call for each user input comprise instructions to determine whether the user input corresponds to a file operation event associated with remote access of the computing application by a user computing device of the plurality of user computing devices; and responsive to a determination that the user input corresponds to a file operation event associated with remote access of the computing application, automatically perform a registry redirection routine using a registry path of a default registry associated with the accessed computing application (e.g., an alphanumeric string corresponding to the default registry of the computing application), wherein the registry redirection routine comprises: (i) a registry path assessment (e.g., to assess whether registry path redirection is required), (ii) responsive to a determination, by the processor (e.g., and by the registry path assessment), that registry path redirection is required, transmission of registry entries to a user-specific registry path (e.g., wherein the user-specific registry is stored on the server), and (iii) responsive to a determination, by the processor (e.g., and by the registry path assessment), that registry path redirection is not required, transmission of registry entries to the default registry associated with the accessed computing application. In certain embodiments, the file path assessment comprises an assessment of a similarity of a registry path name of the default registry of the computing application (e.g., an alphanumeric string associated with a registry path of the default registry) and a registry path name (e.g., an alphanumeric string) in at least one of the one or more pattern files (e.g., assessing whether the registry path name of the default registry of the computing application is the same as a registry path name in the at least one pattern file). In certain embodiments, each pattern file of the one or more pattern files: (i) is associated with a user-specific registry, and (ii) comprises a plurality of registry path names corresponding to a registry path redirection of a registry call and/or a registry entry (e.g., entry of an alphanumeric string, e.g., or a registry key) in the user-specific registry.

In certain embodiments, the one or more pattern files comprises one or more lists of file path identifiers for file path redirection and one or more lists of registry path identifiers for registry path redirection. In certain embodiments, each of one or more of the file path identifiers and the registry path identifiers comprises a wildcard (e.g., presented as an asterisk (*)).

In certain embodiments, the system comprises comprising one or more system drivers (e.g., minifilter drivers) for loading the one or more pattern files (e.g., upon startup of the host operating system), wherein at least one of the one or more system drivers is configured to be installed and uninstalled without restarting the host operating system (e.g., without restarting the server, e.g., without interrupting remote access to the computing application by the plurality of user computing devices).

In certain embodiments, the computing application is a single-tenant application (e.g., wherein the single-tenant application is configured for a single user computing device to access a single instance of the computing application) [e.g., wherein the computing application is not reconfigured (e.g., reprogrammed) to allow the plurality of computing devices to access the computing application at the same time].

In certain embodiments, the server comprises a single instance of the computing application (e.g., wherein the computing application is a single-tenant computing application).

In certain embodiments, the instructions, when executed by the processor, cause the processor to validate a user software license key in the computing application using at least one of the one or more pattern files.

In certain embodiments, the instructions, when executed by the processor, cause the processor to cause display of the computing application (e.g., a graphical user interface (GUI) of the computing application) on a graphical display of the user computing device.

In certain embodiments, each user input of the plurality of user inputs corresponds to a member selected from the group consisting of a request to access (e.g., start, e.g., execute, e.g., log in to) the computing application, a request to create a file associated with the computing application on the server, a request to access a file associated with the computing application on the server, and a command associated with the computing application (e.g., to edit a file in the computing application) [e.g., wherein the user input comprises a file operation event (e.g., associated with creating, accessing, modifying, and/or saving a file in the computing application)].

In certain embodiments, the instructions, when executed by the processor, cause the processor to provide, via the network, access to the computing application by the user computing device.

In certain embodiments, the instructions, when executed by the processor, cause the processor to provide, via the network, access to (e.g., and optionally creation of) a file by the computing application in the host operating system.

In another aspect, the invention is directed to a method of hosting a computing application (e.g., a single-tenant application) executed in a host operating system on a server [e.g., a physical server, e.g., a virtual server (e.g., a cloud-based server)] for remote access of the computing application (e.g., a single instance of the computing application) by a plurality of user computing devices (e.g., at the same time), the method comprising: receiving, by a processor of the server via a network (e.g., continuously, e.g., in real time), a plurality of user inputs from the plurality of user computing devices, wherein each user input of the plurality of user inputs is associated with a computing application of the one or more computing applications in (e.g., executed in) a host operating system of the server, wherein the host operating system comprises one or more pattern files for redirection (e.g., user-specific redirection) of (i) one or more file paths, (ii) one or more registry paths, or both of (i) and (ii); for each user input of the plurality of user inputs, producing, by the processor, using the user input and at least one of the one or more pattern files, a user-specific call (e.g., command) in the computing application [e.g., by transmitting (e.g., redirecting) a file associated with the computing application to a remote (e.g., user-specific) file path of the host operating system, e.g., by transmitting (e.g., redirecting) a registry entry or key associated with the computing application to a user-specific registry path of the host operating system, e.g., by redirecting a registry call by the computing application to a user-specific registry path of the host operating system]; and for the user-specific call produced for each corresponding user input, performing (e.g., executing), by the processor, a user-specific action corresponding to the user-specific call in the computing application (e.g., to create, access, edit, open, close, or save a file associated with the computing application, e.g., wherein the performed user-specific action corresponds only to user input from the user computing device associated with the user-specific call and does not correspond to a user input from a different user computing device) (e.g., thereby allowing a plurality of user computing devices to efficiently access and/or operate the computing application in the host operating system at the same time).

In certain embodiments, the step of producing, for each user input, the user-specific call corresponding to the user-specific action in the computing application comprises: determining, by the processor (e.g., via the network), a user-specific (e.g., or remote) file path using the user input and at least one of the one or more pattern files, wherein the user-specific file path corresponds to a file path in a remote (e.g., not stored in a memory of the server) file system (e.g., wherein the remote file system is not hosted on the server); and transmitting (e.g., redirecting), by the processor, the user input to the user-specific file path [e.g., rather than a default file path associated with the computing application].

In certain embodiments, the step of producing, for each user input, a user-specific call corresponding to the user-specific action in the computing application comprises: determining whether the user input corresponds to a file operation event associated with creation and/or access of the file on the server (e.g., wherein the created and/or accessed file is associated with the computing application); and responsive to a determination that the user input corresponds to a file operation event associated with creation and/or access of the file on the server, automatically performing a file path redirection routine using a file path (e.g., an alphanumeric string corresponding to a "save location") of the created and/or accessed file and at least one of the one or more pattern files, wherein the file path redirection routine comprises: (i) a file path assessment (e.g., to assess whether file path redirection is required), (ii) responsive to a determination, by the processor (e.g., from the file path assessment), that file redirection is required, automatic transmission of the file to a remote file system (e.g., and a user-specific file path) (e.g., wherein the remote file system is not stored on the server), and (iii) responsive to a determination, by the processor (e.g., from the file path assessment), that file redirection is not required, transmission of the file to a local file location (e.g., wherein the local file location is stored on the server). In certain embodiments, the file path assessment comprises an assessment of a similarity of a file path name of the created and/or accessed file (e.g., an alphanumeric string associated with a default file path of the created and/or accessed file) and a file path name in at least one of the one or more pattern files (e.g., an alphanumeric string in the at least one pattern file) (e.g., an assessment of whether the file path name of the created and/or accessed file is the same as a file path name in the at least one pattern file). In certain embodiments, each pattern file of the one or more pattern files: (i) is associated with a user-specific file path of the remote file system, and (ii) comprises a plurality of file path names corresponding to a redirection of the created and/or accessed file to the user-specific file path in the remote file system.

In certain embodiments, the step of producing, for each user input, the user-specific call corresponding to the user-specific action in the computing application comprises: determining, by the processor, a user-specific registry using the user input and at least one of the one or more pattern files [e.g., wherein the user-specific registry corresponds to a registry database (e.g., folder) of the host operating system associated with the user computing device (e.g., and not associated with a different user computing device]; and transmitting (e.g., redirecting), by the processor, a registry entry associated with the user input to the user-specific registry (e.g., rather than the default registry associated with the computing application) and/or accessing, by processor (e.g., and by the computing application), the user-specific registry (e.g., rather than the default registry associated with the computing application).

In certain embodiments, the step of producing, for each user input, the user-specific call corresponding to the user-specific action in the computing application comprises: determining whether the user input corresponds to a file operation event associated with remote access of the computing application by a user computing device of the plurality of user computing devices; and responsive to a determination that the user input corresponds to a file operation event associated with remote access of the computing application, automatically performing a registry redirection routine using a registry path of a default registry associated with the accessed computing application (e.g., an alphanumeric string corresponding to the default registry of the computing application), wherein the registry redirection routine comprises: (i) a registry path assessment (e.g., to assess whether registry path redirection is required), (ii) responsive to a determination, by the processor (e.g., and by the registry path assessment), that registry path redirection is required, transmission of registry entries and/or registry calls to a user-specific registry path (e.g., wherein the user-specific registry is stored on the server), and (iii) responsive to a determination, by the processor (e.g., and by the registry path assessment), that registry path redirection is not required, transmission of registry entries and/or registry calls to the default registry associated with the accessed computing application. In certain embodiments, the registry path assessment comprises an assessment of a similarity of a registry path name of the default registry of the computing application (e.g., an alphanumeric string associated with a default registry path of the default registry) and a registry path name (e.g., an alphanumeric string) in at least one of the one or more pattern files (e.g., an assessment of whether the registry path name of the default registry of the computing application is the same as a registry path name in the at least one pattern file). In certain embodiments, each pattern file of the one or more pattern files: (i) is associated with a user-specific registry, and (ii) comprises a plurality of registry path names corresponding to a registry path redirection of a registry call and/or a registry entry (e.g., entry of an alphanumeric string, e.g., or a registry key) in the user-specific registry.

In certain embodiments, the method comprises validating, by the processor, a user software license key in the computing application using at least one of the one or more pattern files.

In certain embodiments, the method comprises causing display of the computing application (e.g., a graphical user interface (GUI) of the computing application), by the processor via the network, on a graphical display of the user computing device.

In certain embodiments, the method comprises providing, by the processor via the network, access to the computing application by the user computing device.

In certain embodiments, the method comprises providing, by the processor via the network, access to (e.g., and optionally creation of) a file associated with the computing application in the host operating system.

BRIEF DESCRIPTION OF THE FIGURES

The foregoing and other objects, aspects, features, and advantages of the present disclosure will become more apparent and better understood by referring to the following description taken in conjunction with the accompanying drawings, in which:

FIG. 6 is a block diagram of an example computing device and an example mobile computing device, for use in illustrative embodiments of the invention.

Figure 1A:
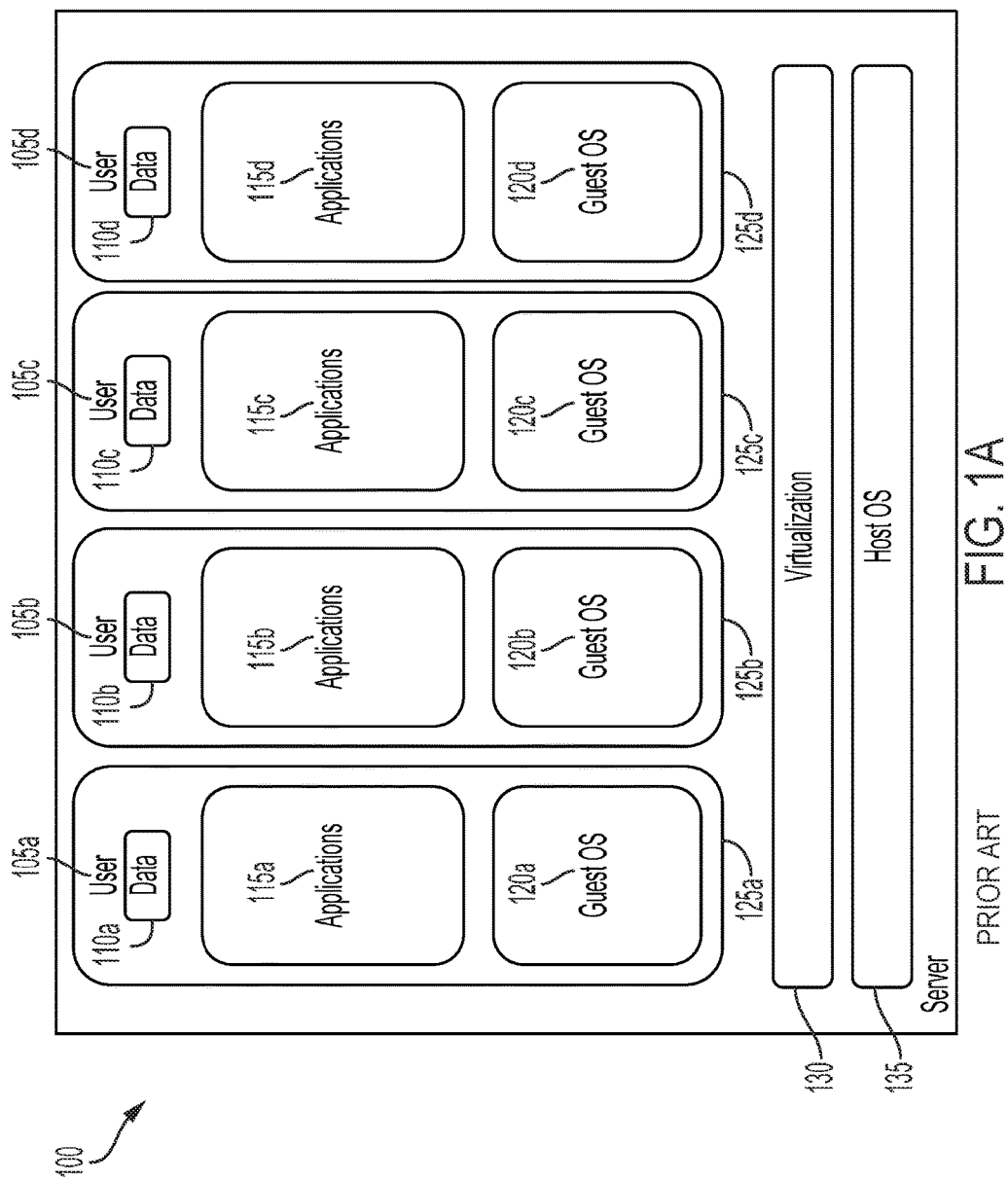
FIG. 1A is a block diagram of a prior-art system for hosting multiple instances of computing applications for remote access by a plurality of user computing devices.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

It is contemplated that systems, architectures, devices, methods, and processes of the claimed invention encompass variations and adaptations developed using information from the embodiments described herein. Adaptation and/or modification of the systems, architectures, devices, methods, and processes described herein may be performed, as contemplated by this description.

Throughout the description, where articles, devices, systems, and architectures are described as having, including, or comprising specific components, or where processes and methods are described as having, including, or comprising specific steps, it is contemplated that, additionally, there are articles, devices, systems, and architectures of the present invention that consist essentially of, or consist of, the recited components, and that there are processes and methods according to the present invention that consist essentially of, or consist of, the recited processing steps.

It should be understood that the order of steps or order for performing certain action is immaterial so long as the invention remains operable. Moreover, two or more steps or actions may be conducted simultaneously.

Elements of embodiments described with respect to a given aspect of the invention may be used in various embodiments of another aspect of the invention. For example, it is contemplated that features of dependent claims depending from one independent claim can be used in apparatus, articles, systems, and/or methods of any of the other independent claims.

The Background section is presented for purposes of clarity and is not meant as a description of prior art with respect to any claim. Headers are provided for the convenience of the reader—the presence and/or placement of a header is not intended to limit the scope of the subject matter described herein.

The present disclosure encompasses the recognition of unresolved problems associated with previous systems and methods used to host computing applications for remote access by user computing devices. The systems and methods described herein provide solutions to these problems by facilitating improved scalability, improved application performance, improved reliability, and decreased cost. For example, "off the shelf" applications (e.g., single-tenant applications without modifications by the software vendor) may be hosted for remote access by a plurality of user computing devices using the systems and methods described herein. In some embodiments, a plurality of servers are used to minimize operational down time. For example, clustered virtual desktops and servers may be combined to provide a hosted network that customers can access from multiple locations via a network (e.g., the internet) without interruptions to service. In some embodiments, the server is clustered and is configured to automatically route users to the most readily-available systems for improved allocation resources and reduced data center expenses (e.g., for operating the clustered server). In other words, the systems and methods described herein, effectively make single-tenant computing applications multi-tenant aware to achieve the benefits of server-hosted applications, while retaining the features and performance of applications that are directly installed on a user computing device. Different server configurations can be used and provide this same improved efficiency and user experience.

FIG. 1A is a block diagram depicting a conventional server 100 for hosting multiple instances of a computing application (instances 115*a-d*) for remote access by a plurality of user computing devices associated with users 105*a-d*. Server 100 includes a host operating system 135 and a virtualization layer 130 for providing virtual machines 125*a-d* for each of users 105*a-d*. Each virtual machine 125*a-d* includes a corresponding guest operating system 120*a-d*, computing applications 115*a-d*, and data 110*a-d*. Thus, for each user 105*a-d*, a separate instance of the guest operating system 120*a-d* is required to host a corresponding instance of the computing applications 115*a-d*, resulting in inefficient server utilization and high operating costs.

Figure 1B:
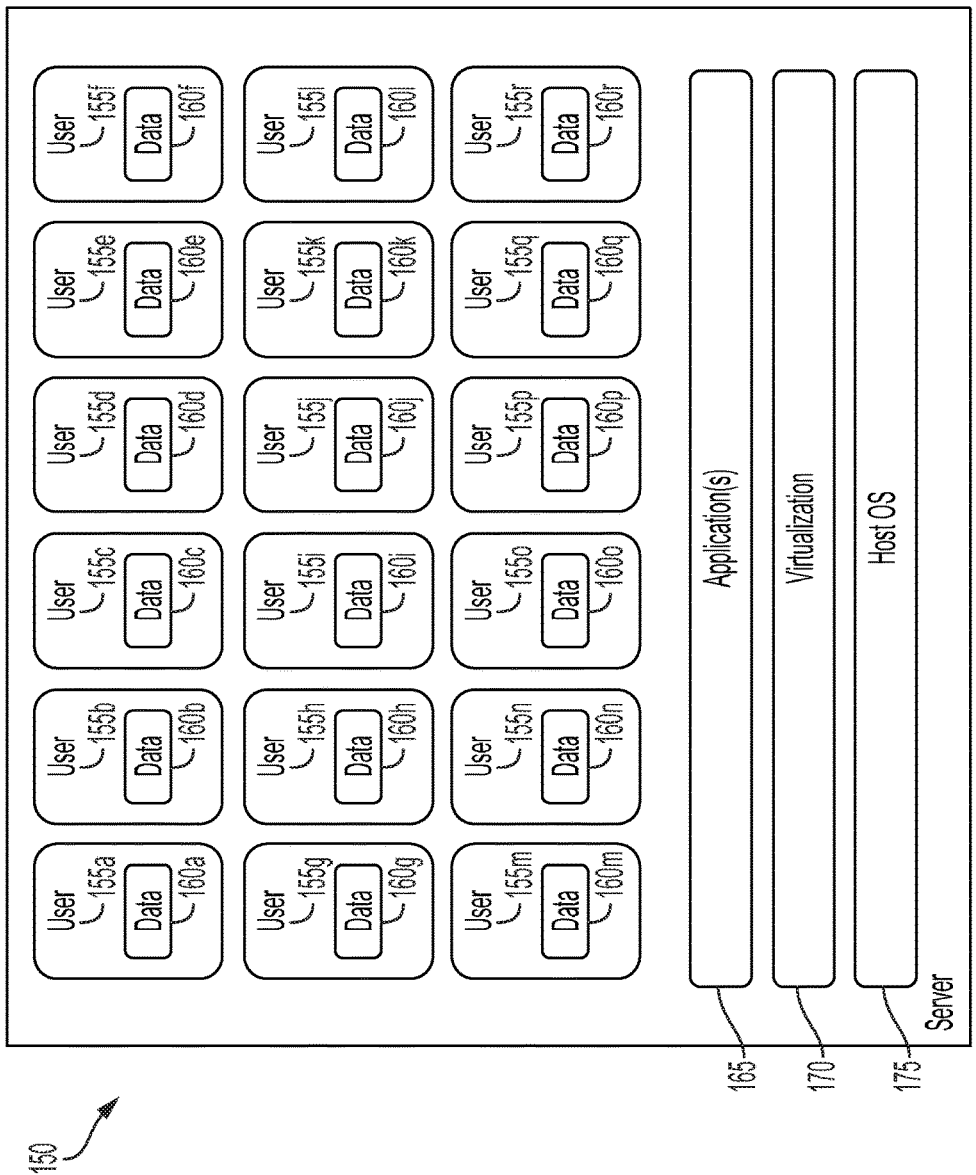
FIG. 1B is a block diagram of system for hosting a single instance of each of one or more computing applications for remote access by a plurality of user computing devices, according to an illustrative embodiment.

An illustrative example of a more efficient configuration of a server 150, according to an illustrative embodiment, is shown in FIG. 1B. The configuration of server 150 overcomes the limitations of the conventional configuration of server 100 shown in FIG. 1A. Server 150 hosts a single instance of computing application(s) 165 for remote access by a plurality of user computing devices associated with users 155*a-r*. The server 150 includes a host operating system 175, a virtualization layer 170, and one or more computing applications 165. Using the system and methods described herein, each of users 155*a-r* accesses a single instance of the application(s) 165. Data 160*a-r* is the data associated with each of users 155*a-r*, respectively. Thus, unlike the conventional server configuration of FIG. 1A, each and every aspect of each of application(s) 165 does not need to be virtualized for each user. Instead, one or more specially designed pattern files are used to allow the plurality of users (users 155*a-r*) to access and operate application(s) 165 at the same time.

Because server 150 includes only a single instance of each of application(s) 165 stored on the server and executed in the host operating system 175, system resources are utilized more efficiently by server 150 of FIG. 1B than by server 100 of FIG. 1A. Since these resources are utilized more efficiently, a large number of users can access one or more of application(s) 165 on the server 150 at the same time. In certain embodiments, 60 or more user computing devices can access a single instance of an application at the same time in a single server. In certain embodiments, 200 or more user computing devices can access a single instance of an application at the same time in a single server. Accordingly, the systems and methods described herein allow each server to securely provide access to a single instance of an application to hundreds of users on the same host operating system.

In certain embodiments, more than one instance of a given computing application is hosted on a single server (e.g., thereby allowing a further increase in the number of user computing devices which may access that application).

Software licenses are maintained and verified for each user computer device such that the user of each user computing device sees, registers, and runs their own license as though they were simply operating their own separate installation of the computing application on their own separate computing device.

Figure 2:
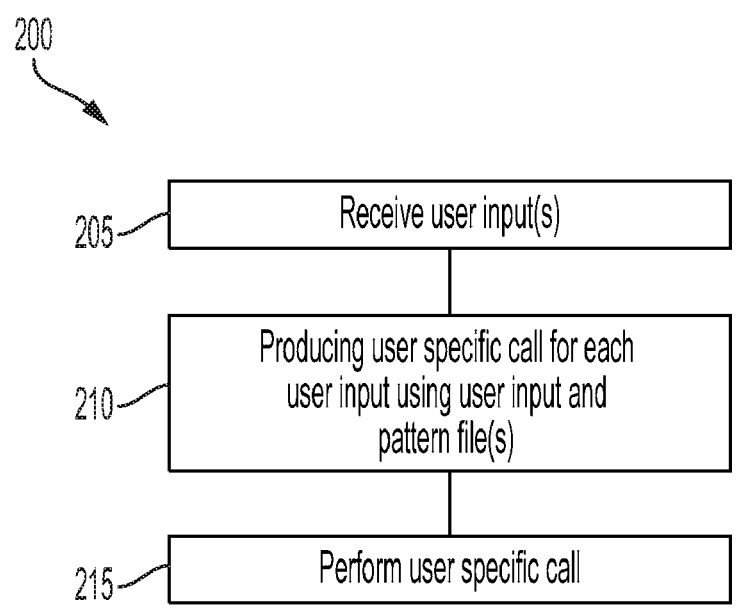
FIG. 2 is a block flow diagram of a method of hosting a computing application for remote access by a plurality of user computing devices, according to an illustrative embodiment.

FIG. 2 is a block flow diagram of a method 200 of hosting a computing application on a server for remote access by a plurality of user computing devices, according to an illustrative embodiment of the invention. The hosted computing application may be one of a plurality of applications that are installed on the server and accessible for remote access by user computing devices. The hosted computing application may be a single-tenant application, as described above. In some embodiments, the server comprises a single instance of the single-tenant computing application for remote access by the plurality of user computing devices. In other embodiments, the server comprises two or more instances of the single-tenant computing to further increase the number of user's who may remotely access and/or operate the application. Thus, in certain embodiments, method 200 allows a plurality of users, via their respective user computer devices (e.g., personal computers, smart phones, tablet computers, or the like) to access a single instance of computing application at the same time and operate the computing application as though it were installed directly on their corresponding user computing device.

As shown in FIG. 2, in Step 205, a plurality of user inputs are received, by a processor of the server via a network, from a plurality of user computing devices. Each user input can be received continuously and/or in real time and is associated with the computing application executed in the host operating system of the server. For example, each user input corresponds to a user computing device that may be accessing and/or operating the computing application hosted on the server. For example, in certain embodiments, a user input corresponds to a request to access (e.g., start, e.g., execute, e.g., log in to) the computing application by the corresponding user computing device. For example, the user input may be associated with logging in to the server and requesting access to a computing application that the user wants to use.

In certain embodiments, a user input also or alternatively corresponds to a request to create a file associated with the computing application on the server. For example, a user who is already accessing the server and/or the computing application via their user computing device may create a file to open and edit in the computing application. In certain embodiments, a user input also or alternatively corresponds to a request to access a file associated with the computing application on the server. For example, a user may access a file stored on the server that is associated with the computing application.

In certain embodiments, a user input also or alternatively corresponds to a command associated with the computing application. For example, the user input may correspond to a request to edit a file in the computing application. For example, a user input may correspond to a particular file operation event, for example, associated with creating, accessing, modifying, and/or saving a file in the computing application.

The host operating system includes one or more pattern files for redirection (e.g., user-specific redirection) of one or more file paths, one or more registry paths, or both. In certain embodiments, each pattern file comprises one or more lists of file path identifiers for file path redirection and/or one or more lists of registry path identifiers for registry path redirection. Redirection of file path(s) and/or registry path(s) allows each of the plurality of users to efficiently access a single instance of a computing application and "experience" the application as though it were installed directly on the user's individual computing device.

In certain embodiments, the host operating system (e.g., the server) comprises a driver (e.g., a file system driver, e.g., a registry driver) for loading the one or more pattern files (e.g., upon startup of the host operating system). In certain embodiments, the system driver (e.g., minifilter driver) is configured to be installed and/or uninstalled without restarting the host operating system. For example, the system driver may be installed and/or uninstalled without restarting the server. For example, the system driver may be installed and/or uninstalled without interrupting remote access to the computing application by the plurality of user computing devices.

Still referring to FIG. 2, in Step 210 of method 200, a user-specific call (e.g., command) is produced, by the processor for each user input, in the computing application using the user input and at least one of the one or more pattern files. For example, the user-specific call may include or be achieved by transmitting (e.g., redirecting) a file associated with the computing application to a remote (e.g., user-specific) file path of the host operating system. For example, the user-specific call may include or be achieved by transmitting (e.g., redirecting) a registry entry or key associated with the computing application and/or redirecting a registry call by the computing application to a user-specific registry path of the host operating system (e.g., redirecting the computing application to a user-specific registry path).

In certain embodiments, a user-specific call is produced (e.g., in Step 210 of FIG. 2) in the computing application using a file redirection routine. Prior to performing this file redirection routine, the server first determines whether the user input corresponds to a file operation event associated with creation and/or access of a file on the server. For example, a file system driver of the host operating system may be configured to monitor and determine whether a user input has been received by a processor of the server. The user input may be associated with accessing a file associated with the computing application being remotely accessed by the user computing device. If the user input is determined to be associated with creating or accessing a file, the file path redirection routine may be performed automatically.

Figure 3:
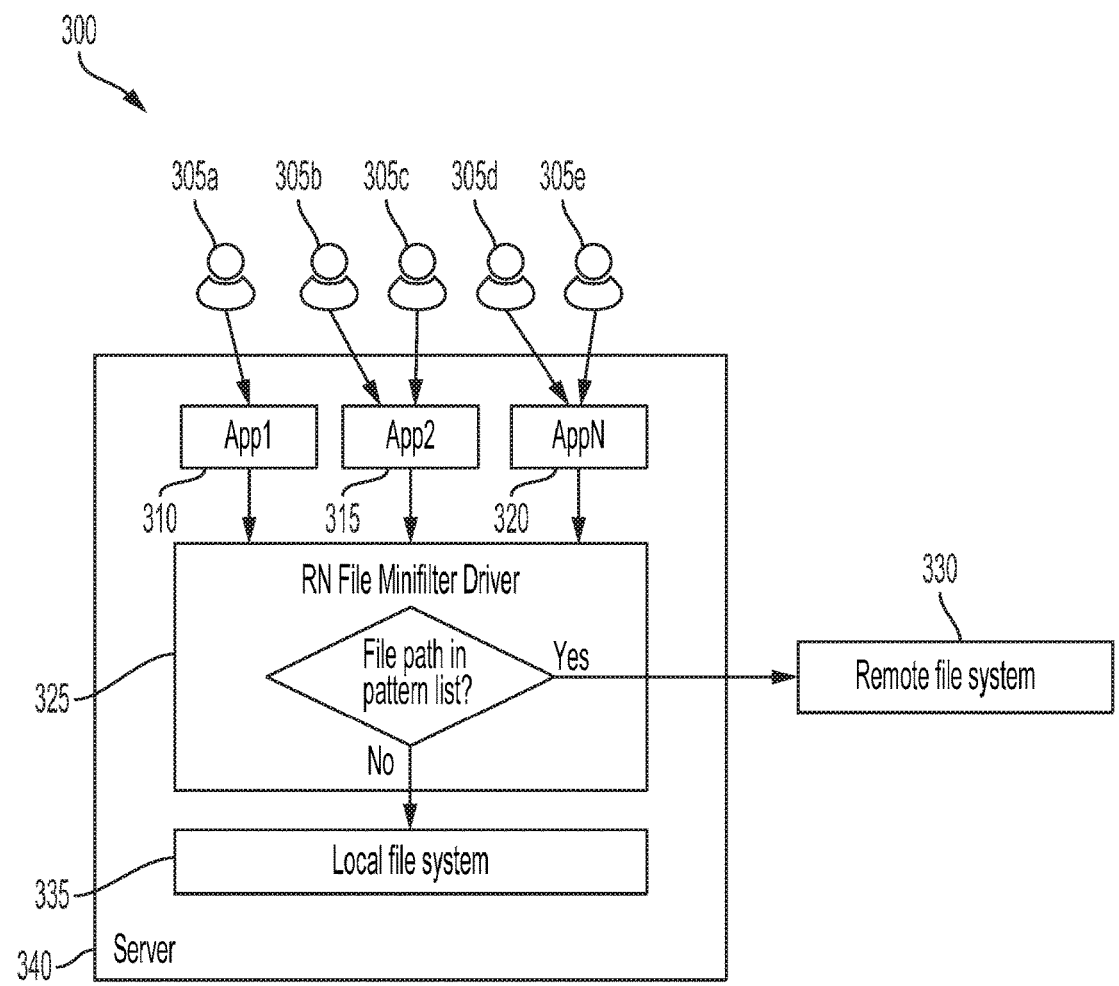
FIG. 3 is a diagram depicting a plurality of user computing devices accessing computing applications hosted on a server via a file path redirection routine, according to an illustrative embodiment.

Referring now to FIG. 3, diagram 300 depicts an illustrative example of a plurality of user computing devices, which correspond to users 305a-e, accessing computing applications (310, 315, and 320) hosted on a server 340 via a file path redirection routine 325. As shown in the illustrative example of FIG. 3, user 305a provides a user input associated with (e.g., for creating and/or accessing a file in) a first computing application 310, users 305b,c provide a user input associated with (e.g., for creating and/or accessing a file in) a second computing application 315, and users 305d,e a user input associated with (e.g., for creating and/or accessing a file in) a third computing application 320.

In the illustrative example of FIG. 3, the file path redirection routine 325 is executed by a minifilter driver installed on the server. This file system driver monitors computing applications (310, 315, and 320) to determine whether a file operation event is performed by an application. Each file redirection routine 325 comprises a file path assessment (e.g., to assess whether file path redirection is required) based, for example on a default file path (e.g., an alphanumeric string corresponding to a default "file location") of the created and/or accessed file and at least one of the one or more pattern files.

In certain embodiments, the file path assessment comprises an assessment of a similarity of a file path name of the created and/or accessed file (e.g., an alphanumeric string associated with a default file path of the created and/or accessed file) and a file path name in at least one of the one or more pattern files (e.g., an alphanumeric string in the at least one pattern file). In other words, in certain embodiments, the file path assessment is an assessment of whether the file path name of the file created and/or accessed by the user is the same as a file path name in at least one of the one or more pattern files.

For example, responsive to a determination by the file path assessment that file redirection is required (e.g., an answer of "yes" to "Is the file path in the pattern list?"), the created and/or accessed file is automatically transmitted to a remote file system 330. The file may be transmitted to a user-specific file path in the remote file system 330. Typically, the remote file system is not stored on the server, however, in certain embodiments, the remote file system is stored on the server. Responsive to a determination by the file path assessment that file redirection is not required (e.g., an answer of "no" to "Is the file path in the pattern list?"), the created and/or accessed file is automatically transmitted to a local file system 335 (e.g., stored on the server).

In certain embodiments, a pattern file is associated with a user-specific file path of the remote file system 330. In certain embodiments, a pattern file comprises a plurality of file path names corresponding to a redirection of the created and/or accessed file to the user-specific file path in the remote file system 330.

An exemplary method for file path redirection, according to the illustrative example of FIG. 3, includes the following steps:

1. The system starts.
2. A file system driver (e.g., a filter driver, e.g., a minifilter driver) is loaded.
3. A pattern file is loaded to the file redirector driver instance.
4. A processor of the server monitors the system for file operation events (e.g., associated with creating, accessing, modifying, and/or saving a file in the computing application).
5. A user logs in (e.g., a user computing device accesses the server).
6. The logged-in user starts an application.
7. The application creates or accesses a file on the server.
8. The system detects a file operation event and performs a file path assessment to determine whether a file path associated with the file operation event is in the pattern files (e.g., to determine "Is the file path listed in the pattern file?").
   a. Responsive to a determination that the file path is in the pattern file (e.g., to a determination of "Yes"), the file is transmitted to a file path on a remote file system and/or the computing application accesses a file path on a remote file system.
   b. Responsive to a determination that the file path is not in the pattern file (e.g., to a determination of "No"), the file is transmitted to the requested (e.g., local) file on the server and/or the computing application accesses the requested file on the server.

An exemplary pattern file may include the following file path identifiers:

\PROGRAM FILES\INTUIT\QuickBooks20*\Components\RegisteredUI
\PROGRAM FILES\INTUIT\QuickBooks2013\Components\RegisteredUI\*.sys
\PROGRAM FILES\INTUIT\QuickBooks2013Ent\Components\RegisteredUI\*.sys
\PROGRAM FILES\INTUIT\QuickBooks2014\Components\RegisteredUI\*.sys
\PROGRAM FILES\INTUIT\QuickBooks2014Ent\Components\RegisteredUI\*.sys
\Program Files (x86)\Journyx\Accountlink\*.log
\Program Files\Lacerte\11tax\*.elf
\Program Files\Lacerte\11tax\urn\*
\Program Files\Lacerte\11tax\winops\*
\Program Files\Lacerte\12tax\NetDir.w2
\Program Files\Lacerte\12tax\NetDir.w3

As shown above, in certain embodiments, one or more of the file path identifiers comprises a wildcard. For example, a wildcard may be presented as an asterisk (*) as shown in the illustrative examples above. Such wildcards can facilitate the efficient construction of useful pattern files (e.g., by grouping related file path identifiers) for effective file path redirection.

Based on the example path identifiers presented above, the following original file paths will be redirected (or not) as presented in Table 1 below.

TABLE 1

| Original file path | Redirected user-specific file path |
| --- | --- |
| C:\Program Files\Intuit\QuickBooks2007\Components\RegisteredUI\Hello.txt | H:\Settings\Program Files\Intuit\QuickBooks2007\Components\RegisteredUI\Hello.txt |
| C:\Program Files (x86)\Journyx\Accountlink\hello.log | H:\Settings\Program Files (x86)\Journyx\Accountlink\hello.log |
| C:\Program Files (x86)\Journyx\Accountlink\hello.txt | Not redirected |
| C:\Program Files\Lacert\12tax\NetDir.w2\hello.txt | H:\Settings\Program Files\Lacert\12tax\NetDir.w2\hello.txt |
| C:\Program Files\Lacert\12tax\NetDir.w2\subfolder\hello.txt | Not redirected |

In certain embodiments, a user-specific call is produced (e.g., in Step 210 of FIG. 2) in the computing application using a registry redirection routine. Prior to performing this registry redirection routine, a processor of the server first determines a whether the user input corresponds to a file operation event associated with remote access of the computing application by the user computing device. If the user input is determined to be associated with remote access of the computing application, a registry redirection routine is automatically performed. This registry redirection routine comprises a registry path assessment which uses a registry path of a default registry associated with the accessed computing application (e.g., an alphanumeric string corresponding to the default registry of the computing application) to assess whether registry path redirection is required.

Figure 4:
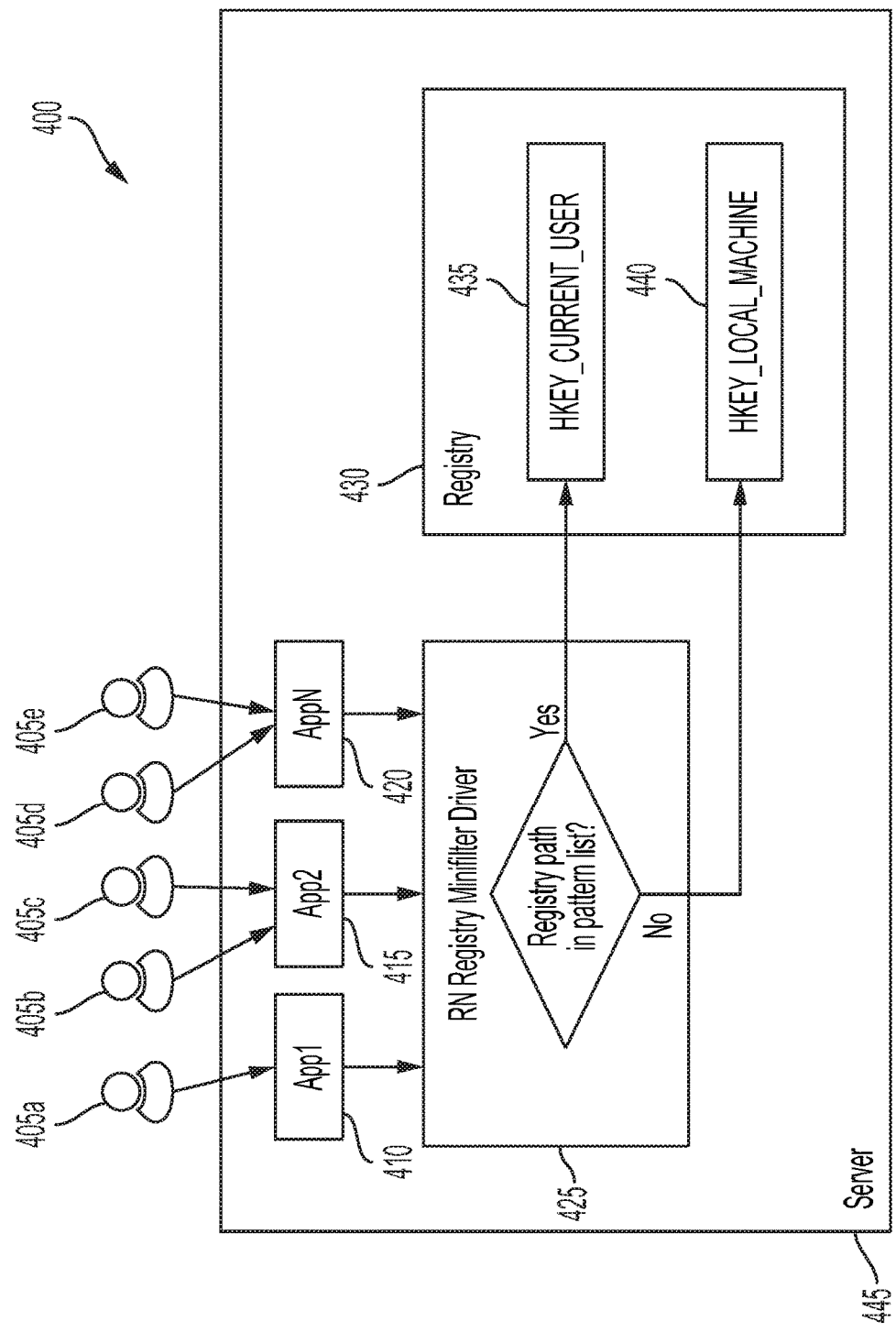
FIG. 4 is a diagram depicting a plurality of user computing devices accessing computing applications hosted on a server via a registry path redirection routine, according to an illustrative embodiment.

Referring now to FIG. 4, diagram 400 depicts an illustrative example of a plurality of user computing devices, which correspond to users 405a-e, accessing computing applications (410, 415, and 420) hosted on a server 445 via a file path redirection routine 425. As shown in the illustrative example of FIG. 4, user 405a provides a user input associated with (e.g., for accessing) a first computing application 410, users 405b,c provide a user input associated with (e.g., for accessing) a second computing application 415, and users 405d,e a user input associated with (e.g., for accessing) a third computing application 420.

In the illustrative example of FIG. 4, the file path redirection routine 425 is executed by a minifilter registry driver installed on the server. This registry driver monitors computing applications (410, 415, and 420) to determine whether a registry operation event is performed by an application. For example, a registry operation event may include accessing a registry entry or key in the server. Each registry redirection routine 325 comprises a registry path assessment (e.g., to assess whether registry path redirection is required) based, for example on a default registry path (e.g., an alphanumeric string corresponding to a default registry path) associated with the computing application and at least one of the one or more pattern files.

In certain embodiments, the file path assessment comprises an assessment of a similarity of a registry path name of the default registry of the computing application (e.g., an alphanumeric string associated with a default registry path of the default registry) and a registry path name (e.g., an alphanumeric string) in at least one of the one or more pattern files (e.g., an assessment of whether the registry path name of the default registry of the computing application is the same as a registry path name in at least one of the one or more pattern files). In other words, in certain embodiments, a registry path assessment is an assessment of whether the registry path name of the default registry of the computing application is the same as a registry path name in at least one of the one or more pattern files.

For example, responsive to a determination by the registry path assessment that registry path redirection is required (e.g., an answer of "yes" to "Is the registry path in a pattern list?"), registry call(s) and/or registry entry(ies) or key(s) are automatically transmitted to a user-specific registry path 435 of registry 430. For example, responsive to a determination by the file path assessment that registry path redirection is not required (e.g., an answer of "no" to "Is the registry path in a pattern list?"), registry call(s) and/or registry entry(ies) or key(s) are automatically transmitted to a default registry path 440 of registry 430.

In certain embodiments, a pattern file is associated with a corresponding user-specific registry. In certain embodiments, a pattern file comprises a plurality of registry path names corresponding to a registry path redirection of a registry call and/or a registry entry or key (e.g., entry of an alphanumeric string) in the user-specific registry.

An exemplary method for registry path redirection, according to the illustrative example of FIG. 4, includes the following steps:
1. The system starts.
2. A registry driver (e.g., filter driver, e.g., minifilter driver) is loaded.
3. A pattern file is loaded to the registry redirector driver instance.
4. A processor of the server monitors the system for operation events (e.g., associated with creating, accessing, modifying, and/or saving a file in the computing application).
5. A user logs in (e.g., a user computing device accesses the server).
6. The logged-in user starts an application.
7. The application accesses a registry key or entry in HKEY_LOCAL_MACHINE.
8. The registry driver detects a registry operation event and performs a registry path assessment (e.g., to determine "Is the registry path listed in the pattern file?")
    a. Responsive to a determination that the registry path is in the pattern file (e.g., to a determination of "Yes"), the registry path is redirected to a user-specific key or entry in HKEY_CURRENT_USER.
    b. Responsive to a determination that the registry path is in the pattern file (e.g., to a determination of "No"), the registry path is not changed (e.g., the default registry key or entry is maintained as HKEY_LOCAL_MACHINE).

An exemplary pattern file may include the following registry path identifiers:
\Registry\Machine\software\Intuit \Settings
\Registry\Machine\software\Intuit\*
\Registry\Machine\software\WOW6432Node\Intuit
\Registry\Machine\software\WOW6432Node\Intuit\*

As shown above, in certain embodiments, one or more of the registry path identifiers comprises a wildcard. For example, a wildcard may be presented as an asterisk (*) as shown in the illustrative examples above. Such wildcards can facilitate the efficient construction of useful pattern files for effective registry path redirection.

Based on the example registry path identifiers presented above, the following original registry paths will be redirected (or not) as presented in Table 2 below.

TABLE 2

| Original registry path | Redirected user-specific registry path |
|---|---|
| \Registry\Machine\software\Intuit\Settings\TraceLevel | HKEY CURRENT USER\software\Intuit\Settings\TraceLevel |
| \Registry\Machine\software\Intuit\Settings\Reader\DebugLevel | Not redirected |
| \Registry\Machine\software\WOW6432Node\Intuit\ABC | HKEY CURRENT USER\software\WOW6432Node\Intuit\ABC |
| \Registry\Machine\software\WOW6432Node\Intuit\ABC\DEF | HKEY CURRENT USER\software\WOW6432Node\Intuit\ABC\DEF |

Referring again to FIG. 2, in Step 215 of method 200, a user-specific action is performed (e.g., executed) by the processor of the server for each user-specific call produced in Step 210. User-specific actions may correspond, for example, to creating, accessing, editing, opening, closing, or saving a file in the computing application. In certain embodiments, a performed user-specific action corresponds only to user input from the user computing device associated with the user-specific call and does not correspond to a user input from a different user computing device. In certain embodiments, a user-specific action is a validation of a license key in the computing application. For example, a processor of the server may validate a user software license key in the computing application using at least one of one or more pattern files. A license can be validated for each of a plurality of users of a single instance of a computing application, thus ensuring that license integrity is maintained for each of these users. A plurality of user computing devices may thus efficiently access and/or operate the computing application in the host operating system at the same time.

In certain embodiments, a processor of the server may cause display of the computing application on a graphical display of the user computing device. For example, a graphical user interface (GUI) of the computing application may be displayed on the graphical display of the user computing device. Graphical indicators in the GUI related to user-specific actions executed in the computing application may be displayed on the graphical display of the user computing device. For example, graphical indicators may be displayed related to editing, accessing, and/or creating a file in the computing application. The GUI and associated graphical indicators presented to each user are thus the same as those which would be displayed for a computing application that is installed and executed directly on the user computing device of the user.

Figure 5:
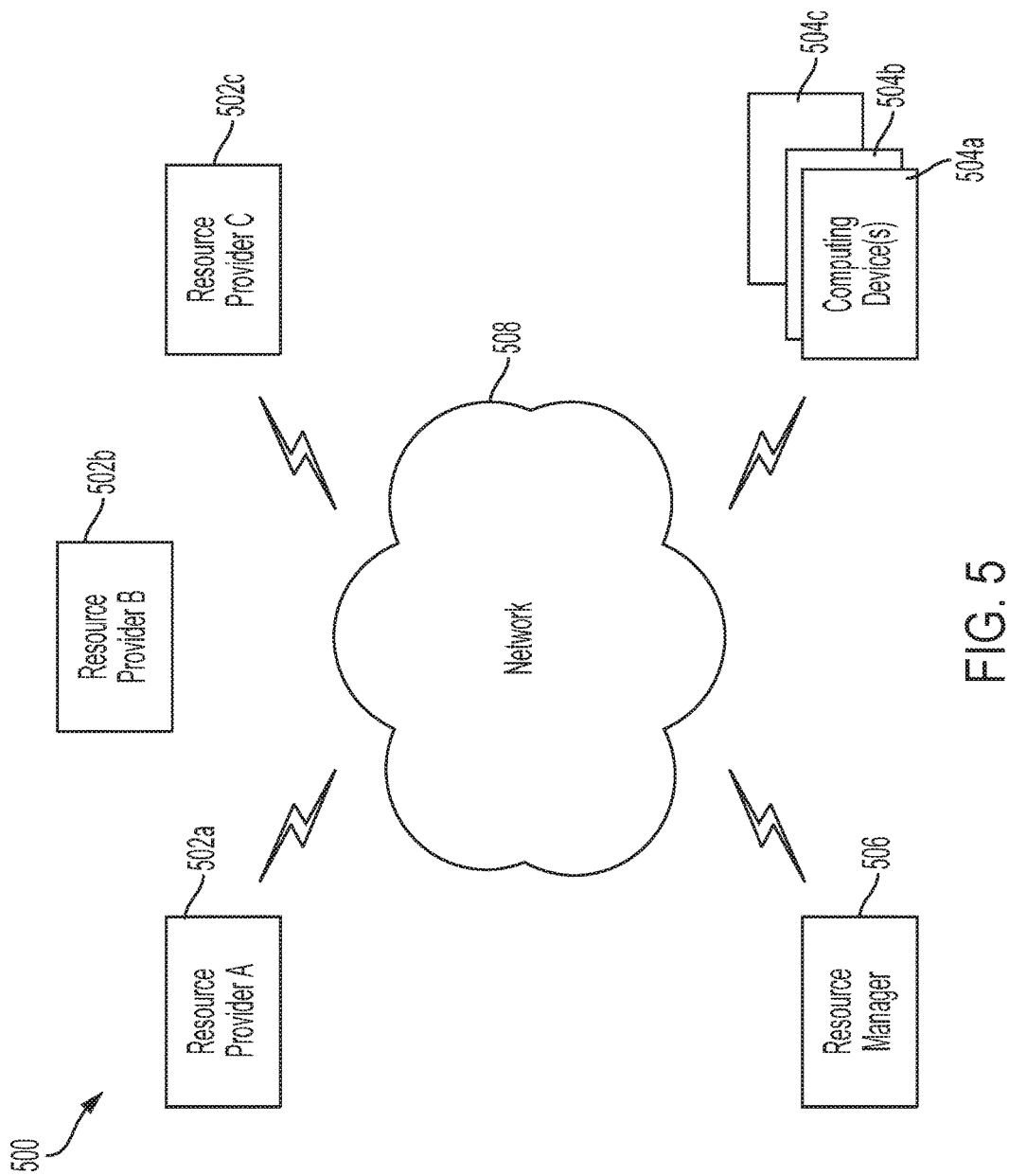
FIG. 5 is a diagram of an example network environment for use in the methods and systems described herein, according to an illustrative embodiment.

As shown in FIG. 5, an implementation of a network environment 500 is shown for use in the systems, methods, and architectures described herein for hosting computing applications on a server for remote access by a plurality of user computing devices. In brief overview, referring to FIG. 5, a block diagram of an exemplary cloud computing environment 500 is shown and described. The cloud computing environment 500 may include one or more resource providers 502a, 502b, 502c (collectively, 502). Each resource provider 502 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 502 may be connected to any other resource provider 502 in the cloud computing environment 500. In some implementations, the resource providers 502 may be connected over a computer network 508. Each resource provider 502 may be connected to one or more computing device 504a, 504b, 504c (collectively, 504), over the computer network 508. Computing devices 504 can include the user computing devices (e.g., personal computers, smart phones, tablet computers, or the like) and servers (e.g., physical or virtual servers) described with respect to embodiments.

The cloud computing environment 500 may include a resource manager 506. The resource manager 506 may be connected to the resource providers 502 and the computing devices 504 over the computer network 508. In some implementations, the resource manager 506 may facilitate the provision of computing resources by one or more resource providers 502 to one or more computing devices 504. The resource manager 506 may receive a request for a computing resource from a particular computing device 504. The resource manager 506 may identify one or more resource providers 502 capable of providing the computing resource requested by the computing device 504. The resource manager 506 may select a resource provider 502 to provide the computing resource. The resource manager 506 may facilitate a connection between the resource provider 502 and a particular computing device 504. In some implementations, the resource manager 506 may establish a connection between a particular resource provider 502 and a particular computing device 504. In some implementations, the resource manager 506 may redirect a particular computing device 504 to a particular resource provider 502 with the requested computing resource.

FIG. 6 shows an example of a computing device 600 and a mobile computing device 650 that can be used in the methods and systems described in the present disclosure. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system). Thus, as the term is used herein, where a plurality of functions are described as being performed by "a processor", this encompasses embodiments wherein the plurality of functions are performed by any number of processors (one or more) of any number of computing devices (one or more). Furthermore, where a function is described as being performed by "a processor", this encompasses embodiments wherein the function is performed by any number (one or more) of processors of any number (one or more) of computing devices (e.g., in a distributed computing system, e.g., associated with a virtual computing system, e.g., of a cloud-based computing system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602).

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface or a DIMM (Double In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provided as a security module for the mobile computing device 650, and may be programmed with instructions that permit secure use of the mobile computing device 650. In addition, secure applications may be provided via the DIMM cards, along with additional information, such as placing identifying information on the DIMM card in a non-hackable manner.

The memory may include, for example, flash memory and/or NVRAM memory (non-volatile random access memory), as discussed below. In some implementations, instructions are stored in an information carrier and, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth®, Wi-Fi™, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Elements of different implementations described herein may be combined to form other implementations not specifically set forth above. Elements may be left out of the processes, computer programs, databases, etc. described herein without adversely affecting their operation. In addition, the logic flows depicted in the figures do not require the particular order shown, or sequential order, to achieve desirable results. Various separate elements may be combined into one or more individual elements to perform the functions described herein. In view of the structure, functions and apparatus of the systems and methods described here, in some implementations.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A system for hosting one or more computing applications for remote access by a plurality of user computing devices, the system comprising:
   a processor and a memory of a server, the memory storing instructions which, when executed by the processor, cause the processor to:
      receive, via a network, a plurality of user inputs from one or more user computing devices of the plurality of user computing devices, wherein each user input of the plurality of user inputs is associated with a computing application of the one or more computing applications in a host operating system of the server, wherein the host operating system comprises one or more pattern files for redirection of (i) one or more file paths, (ii) one or more registry paths, or both of (i) and (ii);
      for each user input of the plurality of user inputs, produce, using the user input and at least one of the one or more pattern files, a user-specific call in the computing application; and
      for the user-specific call produced for each corresponding user input, perform a user-specific action in the computing application.

2. The system of claim 1, wherein the instructions which, when executed by the processor, cause the processor to produce the user-specific call for each user input comprise instructions to:
   determine whether the user input corresponds to a file operation event associated with creation and/or access of a file on the server; and
   responsive to a determination that the user input corresponds to a file operation event associated with creation and/or access of the file on the server, automatically perform a file path redirection routine using a file path of the created and/or accessed file and at least one of the one or more pattern files, wherein the file path redirection routine comprises:
      (i) a file path assessment,
      (ii) responsive to a determination, by the processor, that file redirection is required, automatic transmission of the file to a remote file system, and
      (iii) responsive to a determination, by the processor, that file redirection is not required, transmission of the file to a local file location.

3. The system of claim 2, wherein the file path assessment comprises an assessment of a similarity of a file path name of the created and/or accessed file and a file path name in at least one of the one or more pattern files.

4. The system of claim 2, wherein each pattern file of the one or more pattern files: (i) is associated with a user-specific file path of the remote file system, and (ii) comprises a plurality of file path names corresponding to a redirection of the created and/or accessed file to the user-specific file path in the remote file system.

5. The system of claim 1, wherein the instructions which, when executed by the processor, cause the processor to produce the user-specific call for each user input comprise instructions to
   determine whether the user input corresponds to a file operation event associated with remote access of the computing application by a user computing device of the plurality of user computing devices; and
   responsive to a determination that the user input corresponds to a file operation event associated with remote access of the computing application, automatically perform a registry redirection routine using a registry path of a default registry associated with the accessed computing application, wherein the registry redirection routine comprises:

(i) a registry path assessment, (ii) responsive to a determination, by the processor, that registry path redirection is required, transmission of registry entries to a user-specific registry path, and (iii) responsive to a determination, by the processor, that registry path redirection is not required, transmission of registry entries to the default registry associated with the accessed computing application.

6. The system of claim 5, wherein the file path assessment comprises an assessment of a similarity of a registry path name of the default registry of the computing application and a registry path name in at least one of the one or more pattern files.

7. The system of claim 6, wherein each pattern file of the one or more pattern files: (i) is associated with a user-specific registry, and (ii) comprises a plurality of registry path names corresponding to a registry path redirection of a registry call and/or a registry entry in the user-specific registry.

8. The system of claim 1, wherein the one or more pattern files comprises one or more lists of file path identifiers for file path redirection and one or more lists of registry path identifiers for registry path redirection.

9. The system of claim 8, wherein each of one or more of the file path identifiers and the registry path identifiers comprises a wildcard.

10. The system of claim 1, comprising one or more system drivers for loading the one or more pattern files, wherein at least one of the one or more system drivers is configured to be installed and uninstalled without restarting the host operating system.

11. The system of claim 1, wherein the computing application is a single-tenant application.

12. The system of claim 1, wherein the server comprises a single instance of the computing application.

13. The system of claim 1, wherein the instructions when executed by the processor, cause the processor to validate a user software license key in the computing application using at least one of the one or more pattern files.

14. The system of claim 1, wherein the instructions when executed by the processor, cause the processor to cause display of the computing application on a graphical display of the user computing device.

15. The system of claim 1, wherein each user input of the plurality of user inputs corresponds to a member selected from the group consisting of a request to access the computing application, a request to create a file associated with the computing application on the server, a request to access a file associated with the computing application on the server, and a command associated with the computing application.

16. The system of claim 1, wherein the instructions when executed by the processor, cause the processor to provide, via the network, access to the computing application by the user computing device.

17. The system of claim 1, wherein the instructions when executed by the processor, cause the processor to provide, via the network, access to a file by the computing application in the host operating system.

18. A method of hosting a computing application executed in a host operating system on a server for remote access of the computing application by a plurality of user computing devices, the method comprising:

receiving, by a processor of the server via a network, a plurality of user inputs from the plurality of user computing devices, wherein each user input of the plurality of user inputs is associated with a computing application of the one or more computing applications in a host operating system of the server, wherein the host operating system comprises one or more pattern files for redirection of (i) one or more file paths, (ii) one or more registry paths, or both of (i) and (ii);

for each user input of the plurality of user inputs, producing, by the processor, using the user input and at least one of the one or more pattern files, a user-specific call in the computing application; and for the user-specific call produced for each corresponding user input, performing, by the processor, a user-specific action corresponding to the user-specific call in the computing application.

19. The method of claim 18, wherein the step of producing, for each user input, the user-specific call corresponding to the user-specific action in the computing application comprises:

determining, by the processor, a user-specific file path using the user input and at least one of the one or more pattern files, wherein the user-specific file path corresponds to a file path in a remote file system; and transmitting, by the processor, the user input to the user-specific file path.

20. The method of claim 18, wherein the step of producing, for each user input, a user-specific call corresponding to the user-specific action in the computing application comprises:

determining whether the user input corresponds to a file operation event associated with creation and/or access of the file on the server; and responsive to a determination that the user input corresponds to a file operation event associated with creation and/or access of the file on the server, automatically performing a file path redirection routine using a file path of the created and/or accessed file and at least one of the one or more pattern files, wherein the file path redirection routine comprises:

(i) a file path assessment, (ii) responsive to a determination, by the processor, that file redirection is required, automatic transmission of the file to a remote file system, and (iii) responsive to a determination, by the processor, that file redirection is not required, transmission of the file to a local file location.

21. The method of claim 20, wherein the file path assessment comprises an assessment of a similarity of a file path name of the created and/or accessed file and a file path name in at least one of the one or more pattern files.

22. The method of claim 20, wherein each pattern file of the one or more pattern files: (i) is associated with a user-specific file path of the remote file system, and (ii) comprises a plurality of file path names corresponding to a redirection of the created and/or accessed file to the user-specific file path in the remote file system.

23. The method of claim 18, wherein the step of producing, for each user input, the user-specific call corresponding to the user-specific action in the computing application comprises:

determining, by the processor, a user-specific registry using the user input and at least one of the one or more pattern files; and transmitting, by the processor, a registry entry associated with the user input to the user-specific registry and/or accessing, by processor, the user-specific registry.

24. The method of claim 18, wherein the step of producing, for each user input, the user-specific call corresponding to the user-specific action in the computing application comprises:
- determining whether the user input corresponds to a file operation event associated with remote access of the computing application by a user computing device of the plurality of user computing devices; and
- responsive to a determination that the user input corresponds to a file operation event associated with remote access of the computing application, automatically performing a registry redirection routine using a registry path of a default registry associated with the accessed computing application, wherein the registry redirection routine comprises:
  (i) a registry path assessment,
  (ii) responsive to a determination, by the processor, that registry path redirection is required, transmission of registry entries and/or registry calls to a user-specific registry path, and
  (iii) responsive to a determination, by the processor, that registry path redirection is not required, transmission of registry entries and/or registry calls to the default registry associated with the accessed computing application.

25. The method of claim 24, wherein the registry path assessment comprises an assessment of a similarity of a registry path name of the default registry of the computing application and a registry path name in at least one of the one or more pattern files.

26. The method of claim 24, wherein each pattern file of the one or more pattern files: (i) is associated with a user-specific registry, and (ii) comprises a plurality of registry path names corresponding to a registry path redirection of a registry call and/or a registry entry in the user-specific registry.

27. The method of claim 18, comprising validating, by the processor, a user software license key in the computing application using at least one of the one or more pattern files.

28. The method of claim 18, comprising causing display of the computing application, by the processor via the network, on a graphical display of the user computing device.

29. The method of claim 18, comprising providing, by the processor via the network, access to the computing application by the user computing device.

30. The method of claim 18, comprising providing, by the processor via the network, access to a file associated with the computing application in the host operating system.

* * * * *